(12) United States Patent
Angelov (10) Patent No.: US 12,267,124 B2
(45) Date of Patent: Apr. 1, 2025

(54) COMMUNICATION ADAPTOR FOR A LIGHT TRUNKING SYSTEM

(71) Applicant: ZUMTOBEL LIGHTING GMBH, Dornbirn (AT)

(72) Inventor: Michail Angelov, Finnland (FI)

(73) Assignee: Zumtobel Lighting GmbH, Dornbirn (AT)

( * ) Notice: Subject to any disclaimer, the term of this patent is extended or adjusted under 35 U.S.C. 154(b) by 246 days.

(21) Appl. No.: 17/637,837

(22) PCT Filed: Sep. 23, 2020

(86) PCT No.: PCT/EP2020/076594
§ 371 (c)(1),
(2) Date: Feb. 24, 2022

(87) PCT Pub. No.: WO2021/063770
PCT Pub. Date: Apr. 8, 2021

(65) Prior Publication Data
US 2022/0278709 A1    Sep. 1, 2022

(30) Foreign Application Priority Data
Oct. 2, 2019    (EP) .................................... 19201058

(51) Int. Cl.
*H04B 3/54*    (2006.01)
*H05B 47/185*    (2020.01)

(52) U.S. Cl.
CPC ........... *H04B 3/542* (2013.01); *H05B 47/185* (2020.01); *H04B 2203/5445* (2013.01)

(58) Field of Classification Search
CPC ............ H04B 3/542; H04B 2203/5445; H04B 2203/5458; H04B 2203/5466;
(Continued)

(56) References Cited

U.S. PATENT DOCUMENTS

| 4,763,104 A * | 8/1988 | Inoue ..................... H04B 3/542 375/259 |
| 5,072,216 A * | 12/1991 | Grange .................. H05B 39/00 315/293 |

(Continued)

FOREIGN PATENT DOCUMENTS

| CN | 106793399 A | 5/2017 |
| DE | 19610381 A1 | 9/1997 |

(Continued)

OTHER PUBLICATIONS

PCT/EP2020/076594, International Search Report and Written Opinion dated Jan. 21, 2021, 18 pages.

*Primary Examiner* — Curtis J King
(74) *Attorney, Agent, or Firm* — Andrus Intellectual Property Law, LLP (57) ABSTRACT

The communication adaptor (1) comprises a housing configured to be inserted in a profiled track (12) of the light trunking system (11), the housing comprising outer walls, electrical contacts arranged to be exposed onto at least one of the outer walls, the electrical contacts being configured to contact different electrical lines (14) arranged in the profiled track (12), a Power Line Communication interface configured to receive and/or transmit PLC data, the PLC data being conveyed on one or more of the electrical lines (14), an additional interface configured to receive and/or transmit non-PLC data, preferably IP protocol data, and a data converter configured to convert i) PLC data from the Power Line Communication interface into non-PLC data for the additional interface, and/or ii) non-PLC data from the additional interface into PLC data for the Power Line Communication interface.

12 Claims, 3 Drawing Sheets

(58) Field of Classification Search
CPC .......... H04B 2203/5483; H04B 3/54; H04B 2203/5441; H04B 3/56; H05B 47/185; H05B 47/105; H05B 47/175; F21V 23/06; F21V 23/007; F21V 21/35; H01R 25/14; H04L 12/10; Y02D 30/50
See application file for complete search history.

(56) References Cited

U.S. PATENT DOCUMENTS

| | | | | |
|---|---|---|---|---|
| 5,101,080 | A * | 3/1992 | Ferenc | H02G 5/00 361/650 |
| 5,113,413 | A * | 5/1992 | Brown | H04W 84/08 375/267 |
| 5,291,391 | A * | 3/1994 | Mead | G05B 19/054 700/74 |
| 5,410,720 | A * | 4/1995 | Osterman | H02M 7/5381 455/298 |
| 6,025,775 | A * | 2/2000 | Erlandson | B60Q 1/52 340/471 |
| 6,222,442 | B1 * | 4/2001 | Gager | E05B 83/16 70/92 |
| 6,331,813 | B1 * | 12/2001 | Belliveau | H05B 47/185 362/233 |
| 7,024,119 | B1 * | 4/2006 | Mier-Langner | G08C 23/04 398/118 |
| 7,027,736 | B1 * | 4/2006 | Mier-Langner | H05B 47/195 398/118 |
| 7,408,118 | B2 * | 8/2008 | Thompson | H02G 3/0608 248/68.1 |
| 7,426,581 | B2 * | 9/2008 | Chan | H04B 3/542 340/12.32 |
| 7,482,764 | B2 * | 1/2009 | Morgan | F21V 33/004 362/101 |
| 7,729,375 | B2 * | 6/2010 | Miyazaki | H04B 3/58 375/259 |
| 8,358,097 | B2 * | 1/2013 | Cartwright | F21V 21/15 396/4 |
| 8,565,292 | B2 * | 10/2013 | Galli | H04L 12/407 375/222 |
| 8,915,609 | B1 | 12/2014 | Shah | |
| 9,694,883 | B1 * | 7/2017 | Bonventre | B63B 59/02 |
| 10,050,449 | B2 * | 8/2018 | Hall | H01R 25/142 |
| 10,363,862 | B1 * | 7/2019 | Kinney | B60Q 1/2676 |
| 10,412,283 | B2 * | 9/2019 | Send | H04N 23/695 |
| 10,485,068 | B2 * | 11/2019 | Chemel | F21V 21/30 |
| 10,881,011 | B2 * | 12/2020 | Hashimoto | H04L 12/10 |
| 11,460,173 | B1 * | 10/2022 | Brooks | F21V 23/06 |
| 2002/0080010 | A1 * | 6/2002 | Zhang | H04B 3/548 375/257 |
| 2003/0031018 | A1 * | 2/2003 | Bray | F21V 21/35 362/147 |
| 2003/0039257 | A1 * | 2/2003 | Manis | H04B 3/54 340/310.11 |
| 2003/0096628 | A1 * | 5/2003 | Bar-On | H04W 4/029 455/518 |
| 2005/0047379 | A1 * | 3/2005 | Boyden | H04W 12/033 370/338 |
| 2005/0076148 | A1 * | 4/2005 | Chan | H04B 3/542 709/250 |
| 2005/0116667 | A1 * | 6/2005 | Mueller | E04F 15/02 315/312 |
| 2006/0012175 | A1 * | 1/2006 | Thompson | H02G 3/0608 285/417 |
| 2006/0056855 | A1 * | 3/2006 | Nakagawa | H04B 10/1141 398/183 |
| 2006/0108794 | A1 * | 5/2006 | Thompson | H02G 3/0608 285/149.1 |
| 2006/0135146 | A1 * | 6/2006 | Bucknell | H04H 20/91 455/450 |
| 2006/0158343 | A1 * | 7/2006 | Lee | H04L 12/2807 340/9.1 |
| 2006/0243475 | A1 * | 11/2006 | Thompson | H02G 3/0608 174/68.1 |
| 2006/0262553 | A1 * | 11/2006 | Bogos | B60Q 1/441 362/541 |
| 2007/0091925 | A1 * | 4/2007 | Miyazaki | H04B 3/542 370/469 |
| 2007/0116042 | A1 * | 5/2007 | Lee | H04L 12/2838 370/466 |
| 2007/0213879 | A1 * | 9/2007 | Iwamura | H04B 3/56 700/292 |
| 2007/0230377 | A1 * | 10/2007 | Nosaka | H04J 3/0605 370/294 |
| 2007/0293953 | A1 * | 12/2007 | Hoshi | H04B 3/54 700/12 |
| 2008/0007047 | A1 * | 1/2008 | Thompson | H02G 3/0608 285/149.1 |
| 2008/0155915 | A1 * | 7/2008 | Howe | H02G 3/00 174/40 R |
| 2008/0191477 | A1 * | 8/2008 | Thompson | F16L 23/14 285/330 |
| 2008/0247522 | A1 * | 10/2008 | Okuya | H04M 11/062 379/93.01 |
| 2008/0302033 | A1 * | 12/2008 | Insalaco | B66C 7/04 52/220.2 |
| 2008/0303661 | A1 * | 12/2008 | Chick | G08B 13/196 340/541 |
| 2009/0015396 | A1 * | 1/2009 | Yeh | H04B 3/54 340/538.17 |
| 2009/0170474 | A1 * | 7/2009 | Bright | H04L 63/123 455/411 |
| 2009/0175321 | A1 * | 7/2009 | Sasaki | H04B 3/56 455/41.2 |
| 2009/0198384 | A1 * | 8/2009 | Ahn | H02J 13/00002 700/295 |
| 2010/0003381 | A1 * | 1/2010 | Smith | B01D 61/025 210/136 |
| 2010/0067244 | A1 * | 3/2010 | Cartwright | F21V 21/15 362/386 |
| 2010/0237803 | A1 * | 9/2010 | Wolf | H05B 47/175 315/297 |
| 2010/0278223 | A1 * | 11/2010 | Riveiro | H04B 3/56 375/222 |
| 2011/0164364 | A1 * | 7/2011 | Baum | H04B 3/542 361/679.02 |
| 2011/0170704 | A1 * | 7/2011 | Smith | H04B 3/548 381/77 |
| 2011/0213968 | A1 * | 9/2011 | Zhang | H04L 67/12 713/158 |
| 2012/0133298 | A1 * | 5/2012 | Campbell | H05B 47/185 315/250 |
| 2012/0275526 | A1 * | 11/2012 | Hughes | H04B 3/542 375/257 |
| 2012/0307917 | A1 * | 12/2012 | Goldhamer | H04B 3/542 375/257 |
| 2013/0155672 | A1 * | 6/2013 | Vo | F21V 21/15 362/382 |
| 2013/0289750 | A1 * | 10/2013 | Souvay | H05B 47/185 700/90 |
| 2014/0217906 | A1 * | 8/2014 | Vo | H05B 47/19 315/149 |
| 2014/0300462 | A1 * | 10/2014 | Russ | B60Q 1/2692 340/471 |
| 2015/0137683 | A1 * | 5/2015 | Krames | F21V 23/006 315/294 |
| 2015/0233533 | A1 * | 8/2015 | Van Es | F21S 8/061 313/49 |
| 2015/0253360 | A1 * | 9/2015 | Wendt | H05B 47/18 307/18 |
| 2015/0338068 | A1 * | 11/2015 | Bolscher | F21V 19/04 29/825 |
| 2015/0346320 | A1 * | 12/2015 | Hartman | H05B 47/105 315/312 |
| 2015/0351325 | A1 * | 12/2015 | Shelor | A01G 7/045 47/58.1 LS |
| 2016/0190807 | A1 * | 6/2016 | Wendt | H05B 47/10 307/112 |

(56) References Cited

U.S. PATENT DOCUMENTS

| | | | | |
|---|---|---|---|---|
| 2016/0192072 | A1* | 6/2016 | Dalgleish | H04L 12/10 455/3.03 |
| 2017/0006694 | A1* | 1/2017 | Davis | H05B 47/19 |
| 2017/0074471 | A1 | 3/2017 | Panek | |
| 2017/0317504 | A1* | 11/2017 | Hall | H02J 4/00 |
| 2017/0318649 | A1* | 11/2017 | Hall | F21S 8/043 |
| 2017/0370531 | A1* | 12/2017 | Cai | F21K 9/278 |
| 2018/0035518 | A1* | 2/2018 | Cook | H04L 12/2816 |
| 2018/0073711 | A1* | 3/2018 | Bader | F21V 23/002 |
| 2018/0209625 | A1* | 7/2018 | Lu | F21V 23/06 |
| 2018/0265220 | A1* | 9/2018 | Li | H05B 45/30 |
| 2019/0372619 | A1* | 12/2019 | Hsu | H04B 3/06 |
| 2020/0244313 | A1* | 7/2020 | Visconti | H02J 3/00 |
| 2020/0326047 | A1* | 10/2020 | De Bevilacqua | F21S 8/043 |
| 2022/0110196 | A1* | 4/2022 | Heng | H05B 45/20 |
| 2022/0201826 | A1* | 6/2022 | Tousignant Gendron | H05B 47/185 |
| 2022/0252655 | A1* | 8/2022 | Sternberg | G01R 31/085 |
| 2022/0329286 | A1 | 10/2022 | Machate | |
| 2023/0120058 | A1* | 4/2023 | Adams | H04L 65/65 370/259 |

FOREIGN PATENT DOCUMENTS

| | | |
|---|---|---|
| DE | 102009054510 A1 | 6/2011 |
| DE | 102011007416 A1 | 10/2012 |
| DE | 102014205892 A1 | 10/2015 |
| DE | 102016011815 B3 | 2/2018 |
| EP | 3203814 A1 | 8/2017 |
| JP | 2007174699 | 7/2007 |
| JP | 2009094945 | 4/2009 |
| WO | 2012089355 A1 | 7/2012 |
| WO | 2013024460 A2 | 2/2013 |
| WO | 2017194310 A1 | 11/2017 |

* cited by examiner

Fig. 5

COMMUNICATION ADAPTOR FOR A LIGHT TRUNKING SYSTEM

CROSS-REFERENCE TO RELATED APPLICATION

The present application is the U.S. national stage application of international application PCT/EP2020/076594 filed Sep. 23, 2020, which international application was published on Apr. 8, 2021 as International Publication WO 2021/063770 A1. The international application claims priority to European Patent Application 19201058.5 filed Oct. 2, 2019.

FIELD OF THE INVENTION

The present invention relates to a communication adaptor for a light trunking system. Further, the present invention relates to a light trunking system comprising at least two of such communication adaptors. Besides, the present invention relates to a method for communicating data over such a light trunking system.

BACKGROUND OF THE INVENTION

A light trunking system of the background art usually comprises a profiled track and electrical lines extending along the profiled track so as to supply power and data to a series of lighting devices or sensors. The electrical lines may be arranged at inner side surfaces of the profiled track, such that the electrical lines may conduct multiple phases of an AC voltage and may be accessed at any location along the profiled track, in order for example to supply AC/DC converters for powering a series of lighting devices.

However, a light trunking system of the background art presents some drawbacks and limitations. In particular, providing such a light trunking system with a flexible data communication equipment, can require significant installation effort, complexity and cost, like the installation of supplementary wires for a data bus, e.g. a Digital Addressable Lighting Interface (DALI) bus.

SUMMARY OF THE INVENTION

In view of the above-mentioned drawbacks and limitations, the present invention aims to improve the light trunking systems of the background art. An objective is to provide a light trunking system offering an enhanced flexibility and speed in the communication operations, while ensuring a relatively low installation effort. The objective is achieved by the embodiments defined in the independent claims. The dependent claims define further advantageous implementations.

In particular, the objective may be achieved by providing communication adaptors, which may be integrated in a light trunking system, in particular inserted into the profiled track thereof. A first embodiment provides a communication adaptor for a light trunking system, the communication adaptor comprising:
  a housing configured to be inserted in a profiled track of the light trunking system, the housing comprising outer walls,
  electrical contacts arranged to be exposed onto at least one of the outer walls, the electrical contacts being configured to contact different electrical lines arranged in the profiled track,
  a Power Line Communication (PLC) interface configured to receive and/or transmit PLC data, the PLC data being conveyed on one or more of the electrical lines,
  an additional interface configured to receive and/or transmit non-PLC data, preferably IP protocol data, and
  a data converter configured to convert i) PLC data from the Power Line Communication interface into non-PLC data for the additional interface, and/or ii) non-PLC data from the additional interface into PLC data for the Power Line Communication interface.

Thus, the PLC interface may feed external data into the light trunking system by receiving and/or transmitting PLC data, which is conveyed along the electrical lines between various interface modules arranged along the profiled track. The additional interfaces may receive the PLC data and convert it back into non-PLC data to be sent via the Ethernet. As a result, the PLC communication over the electrical lines of the light trunking system may be used as an intermediate section of a larger communication path between various interface modules and the Ethernet backbone.

In some implementations, the PLC data may be data that is modulated into, and conveyed by, a PLC signal transmitted over an electrical line.

In some implementations, the data converter may convert PLC data or non-PLC data by modulating and/or demodulating PLC data or non-PLC data respectively.

In some implementations, the housing may be inserted in the profiled track so as to be flush or level with the profiled track.

The term "connect" and its derivatives designates any connection that may be achieved in a wireless manner (electromagnetically) or in a wire-bound manner (electrically), and that may convey only power, only data or both power and data (e.g. PLC).

In various implementations, the Power Line Communication interface may be configured to modulate and/or demodulate PLC data transmitted and/or received at different poles of the electrical lines in a parallel manner.

Thus, the parallel modulation and/or demodulation makes it possible to increase the processing speed of PLC data in the Power Line Communication interface.

In various implementations, the additional interface may be an Ethernet interface, the Ethernet interface being preferably a wireless Ethernet interface or a wire-bound Ethernet interface, the Ethernet interface being preferably a Power-over-Ethernet (PoE) Ethernet interface. As a general aspect, the additional interface my supply power, preferably DC power when implemented as a wire-bound interface.

Thus, the Ethernet interface makes it possible to use an IP protocol, which facilitates the integration and operation of the light trunking system with other systems.

In various implementations, the data converter may be a PLC modem, preferably a PLC modem configured to modulate and demodulate PLC data into and from IP protocol data.

Thus, the PLC modem may conveniently be integrated in the communication adaptor.

A further embodiment provides a light trunking system a light trunking system for supplying power and data to a series of lighting devices, wherein the light trunking system comprises a profiled track and electrical lines extending along the profiled track, and wherein the light trunking system further comprises at least two communication adaptors as afore-described.

Thus, due to the communication adaptors, the light trunking system may offer an enhanced flexibility and speed in the communication operations, while ensuring a relatively low installation effort. The light trunking system may support a fast data communication network in the Gbps range (Gigabits per second). In particular, the light trunking system makes it possible to reduce the time and cost required to install and integrate, to a local digital telecommunication network or to the cloud, indoor wireless data access solutions, for example WiFi, pLTE, 5G, LiFi, or localization enablement solutions, for example RFID, BLT, UWB. Also, the light trunking system makes it possible to retrofit existing light trunking systems, for example existing Tecton® systems made by Zumtobel, by adding thereto the aforementioned communication adaptors.

In various implementations, the light trunking system may further comprise an interface module selected in the group consisting of: a lighting device, a camera, a WLAN access point, a Private LTE access point, a 5G access point, a LiFi access point, a RTLS module, a RFID module, a wireless communication device, a multi array presence detector, a multi parameters high speed reading sensor for reading parameters like temperature, humidity, carbon dioxide presence or concentration, TVOC, presence, HAL, accelerometer, and any other device requiring fast data connectivity, wherein at least one of the communication adaptors is connected to the interface module via the additional interface, and preferably via a cable for non-PLC data, for example an Ethernet patch cable.

Thus, such interface modules may enhance the flexibility of the light trunking systems, as various functions may be fulfilled.

In some implementations, the WLAN access point may be a WiFi hotspot.

In various implementations, the electrical lines may be configured to provide AC voltage, the PLC data being preferably narrowband PLC data.

In various implementations, the electrical lines may have different poles, which are arranged on at least one inner side surface of the profiled track.

Thus, the electrical lines and poles may conveniently be accessed from outside.

In various implementations, at least one of the communication adaptors may be connected, via the additional interface, to a computing machine, which is preferably a cloud-based computing machine, and/or to a computing engine, which is preferably an Artificial Intelligence engine.

Thus, the computing engine and/or the computing machine may provide performance reports about the light trunking system.

Another embodiment provides a method for communicating data over a light trunking system, the method comprising:
  implementing a light trunking system as afore-described,
  measuring instant parameters representative of the communications performed over the electrical lines via the communication adaptors,
  the instant parameters being preferably selected in the group consisting of: the number of electrical lines instantly used, an identification of the electrical lines instantly used, an actual speed of data transmission over each electrical line, a target speed of data transmission over each electrical line, an actual speed of data conversion by each communication adaptor, a target speed of data conversion by each communication adaptor, an actual latency of data conversion by each communication adaptor, a target latency of data conversion by each communication adaptor, an actual latency of data transmission over each electrical line, a target latency of data transmission over each electrical line, a volume of data to be transmitted, a volume of data to be converted, a level of interferences in each electrical line and/or in each communication adaptor, a port status of each additional interface, and a dimming level set for each lighting device,
  dynamically processing, by a computing engine, the measured instant parameters, so as to determine a communication capacity over each electrical line via the communication adaptors, the computing engine being preferably an Artificial Intelligence engine,
  selecting, preferably by the computing engine, an electrical line having a determined communication capacity above a predetermined threshold, and
  communicating data over the at least one selected electrical line.

Thus, the method makes it possible to obtain a fast data communication by dynamically operating the electrical lines to obtain high communication capacities.

In some implementations, the selection of the at least one electrical line may be performed by the computing engine.

In some implementations, the implementation of the light trunking system may include:
  i) inserting the at least two communication adaptors in the profiled track and
  ii) connecting the at least two communication adaptors to the different electrical lines arranged in the profiled track.

In various implementations, the light trunking system may further comprise mechanical switches, each mechanical switch being arranged to selectively connect a respective communication adaptor to different electrical lines, wherein the method further comprises: controlling the connection, via one of the mechanical switches, of a respective communication adaptor to the selected electrical line.

Thus, the mechanical switches enable to perform the physical selection of the electrical lines selected for their high communication capacity.

In various implementations, the method may further comprise: comparing with each other, by the computing engine, the communication capacities determined respectively for the electrical lines, and, preferably, selecting the electrical line having the highest determined communication capacity.

Thus, the comparison enables the computing engine to swiftly select the most appropriate electrical line(s).

In various implementations, the method may further comprise, after the measuring of instant parameters, transmitting, by the communication adaptors, the measured instant parameters.

In various implementations, the method may further comprise:
  implementing several light trunking systems,
  regularly collecting, by a computing machine, performance data from each one of the light trunking systems,
  dynamically assessing, by the computing machine, the collected performance data, preferably by comparing the collected performance data with each other and/or with recorded performance data and/or with a recorded performance model, and
  as a function of the dynamic assessment, issuing, by the computing machine, a message suggesting a change in at least one of the light trunking systems in order to enhance the respective performance data.

Thus, the computing machine may enable increasing the performance of each light trunking system, by suggesting apposite changes in the installed configuration, for example in the interface modules equipping the light trunking system.

In some implementations, the computing machine may be a cloud-based computing machine.

In some implementations, the method may further include provisioning a Grade of Service (GoS) and/or a service-level agreement (SLA) with the collected performance data.

It has to be noted that all devices, modules, interfaces, elements, components, members, units and means described in the present application could be implemented in any technically applicable combination of the implementation forms. All steps which are performed by the various entities described in the present application as well as the functionalities described to be performed by the various entities are intended to mean that the respective entity is adapted to or configured to perform the respective steps and functionalities. Even if, in the following description of specific implementations and embodiments, a specific functionality or step to be performed by external entities is not reflected in the description of a specific detailed element of that entity which performs that specific step or functionality, it should be clear for a skilled person that these methods and functionalities can be implemented in any technically applicable combination of the implementations and embodiments.

BRIEF DESCRIPTION OF THE DRAWINGS

The above-described embodiments and implementations will be further explained in the following description of specific implementations in relation to the appended drawings, in which.

DETAILED DESCRIPTION

Figure 1:
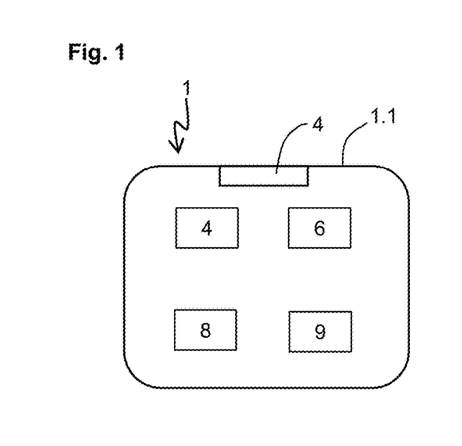
FIG. 1 is a schematic view illustrating a communication adaptor according to an embodiment.

FIG. 1 illustrates a communication adaptor 1 comprising a housing 2, electrical contacts 4, a Power Line Communication interface (PLC interface) 6, an additional interface 8, and a data converter 9.

Figure 2:
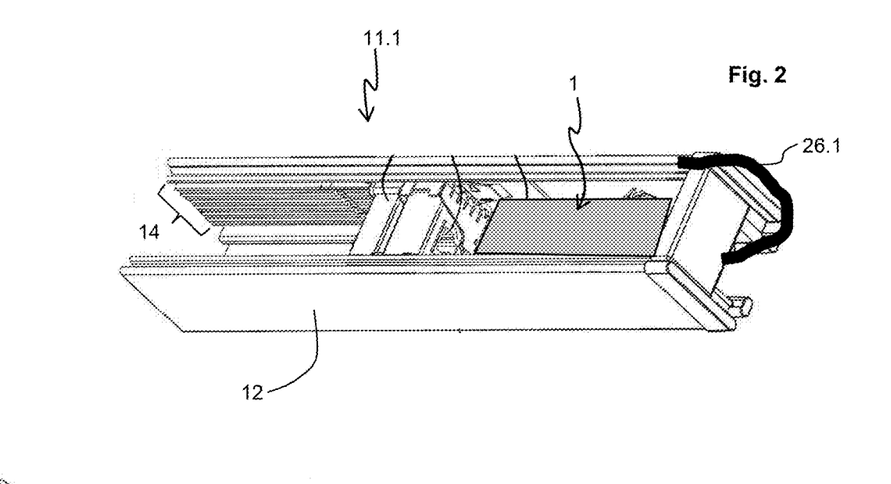
FIG. 2 is a schematic perspective view illustrating the communication adaptor of FIG. 1 mounted on an element of a light trunking system according to an embodiment.
Figure 3:
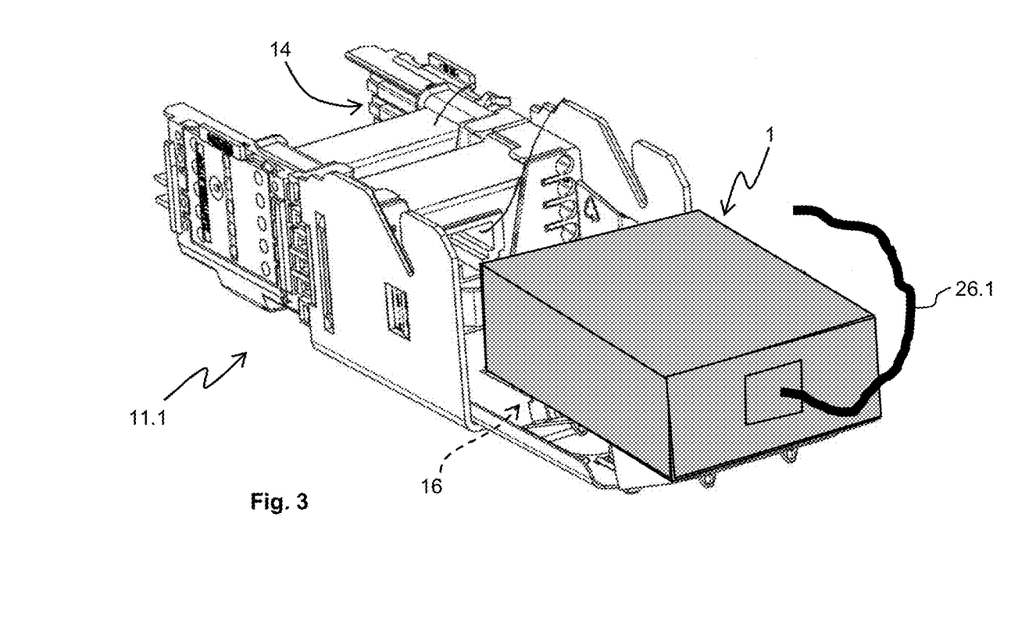
FIG. 3 is a schematic perspective view, at an angle different from FIG. 2, of the element of the light trunking system of FIG. 2.
Figure 4:
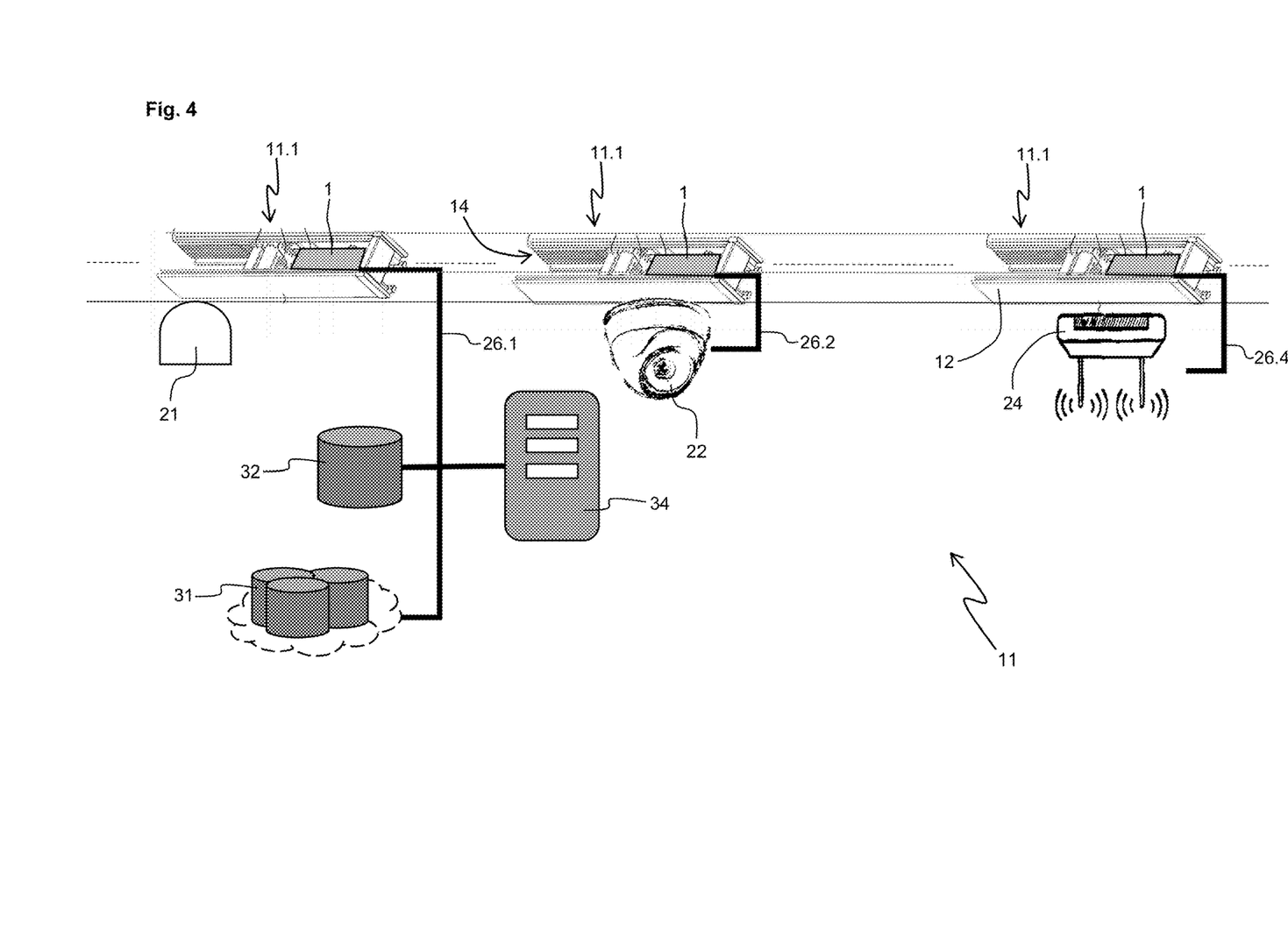
FIG. 4 is a schematic view of a section of the light trunking system of FIGS. 2 and 3.

As illustrated in FIGS. 2 to 4, the housing 1 is configured to be inserted in a profiled track 12 of a light trunking system 11. The housing 1 comprises outer walls 1.1. The housing 2 may be composed of a suitable plastic material. The housing 2 may be inserted in the profiled track 12 so as to be flush or level with the profiled track 12, as visible in FIGS. 2 and 3.

The electrical contacts 4 are arranged to be exposed onto one of the outer walls 1.1. The electrical contacts 4 are configured to contact different electrical lines 14 arranged in the profiled track 12. The electrical contacts 4 may be formed in a conventional manner, like for example one commercialized under the name Tectron, Trinos, ZX2, Supersystem or Supersystem 2. The electrical lines 14 may have different poles, which may be arranged on an inner side surface of the profiled track 12.

The mechanical design and concept of the light trunking system 12 is described in EP 1284035 A1 which forms an integral part of the description and which is hereby incorporated by reference.

The PLC interface 6 is configured to receive and/or transmit PLC data. When the communication adaptor 1 is in service, the PLC data are conveyed on one or more of the electrical lines 14. The PLC interface 6 may be configured to modulate and demodulate the PLC data transmitted and received at the different poles of the electrical lines 14 in a parallel manner. The PLC interface 6 may be formed in a conventional manner. The PLC data may be data that is modulated into, and conveyed by, a PLC signal transmitted over one of the electrical lines 4.

The additional interface 8 is configured to receive and/or transmit non-PLC data. In the example of FIGS. 1 to 4, the additional interface 8 may be configured to receive and transmit IP protocol data as the non-PLC data. The additional interface 8 may be an Ethernet interface, herein a wire-bound Ethernet interface. Further, the additional interface 8 may preferably be a power over Ethernet (PoE) Ethernet interface. For example, the additional interface 8 may include an Ethernet interface having a port capable of supplying power over the Ethernet cable towards the next device.

The data converter 9 is configured to convert i) PLC data from the PLC interface 6 into non-PLC data for the additional interface 8, and/or ii) non-PLC data from the additional interface into PLC data for the PLC interface. The data converter 9 may be a PLC modem, which is preferably configured to modulate and demodulate PLC data into and from IP protocol data. The data converter 9 may convert PLC data or non-PLC data by modulating and demodulating PLC data or non-PLC data respectively.

FIGS. 2 and 3 illustrate an element 11.1 of a light trunking system 11. FIG. 4 illustrates a section of the light trunking system 11, which section comprises three elements 11.1.

The light trunking system 11 is intended to supply power and data to a series of lighting devices 21, as visible in FIG. 4. The light trunking system 11 comprises the profiled track 12 and the electrical lines 14. The profiled track 12 may be straight, like in FIG. 4, and/or curved depending on the locations of the lighting devices 21.

The electrical lines 14 extend along the profiled track 12. In the example of FIGS. 2 to 4, the electrical lines 14 may be configured to provide AC voltage, and the PLC data may be narrowband PLC data.

As visible in FIG. 4, the light trunking system 11 further comprises several elements 11.1. As each element 11.1 comprises a communication adaptor 1, the light trunking system 11 comprises several communication adaptors 1. The elements 11.1, hence also the communication adaptors 1, may be arranged along the profiled track 12.

The light trunking system 11 may further comprise an interface module selected in the group consisting of: a lighting device 21, a camera 22, a WLAN access point 24, a Private LTE access point, a 5G access point, a LiFi access point, a not-shown RTLS module, a not-shown RFID module, a not-shown wireless communication device, and a not-shown high data rate sensor. The WLAN access point 24 may be a WiFi hotspot.

The light trunking system 11 may further comprise cables 26.1, 26.2, 26.4 for the non-PLC data. For example, the cables 26.1, 26.2, 26.4 may be formed of Ethernet patch cables, so as to convey IP protocol data. The cables 26.1, 26.2, 26.4 may be arranged to connect a communication adaptor 1 to an interface module 21, 22, 24. The communication adaptors 1 may be connected to respective interface modules 21, 22, 24 via their respective additional interface 8. The cable 26.1, 26.2, or 26.4 may support bidirectional communications (duplex) or, alternatively, unidirectional communications.

Thus, the PLC interface 6 of the communication adaptor 1 may feed external data into the light trunking system 11 by receiving and transmitting PLC data, which is conveyed along the electrical lines 14 between the interface modules 26.1, 26.2, 26.4 arranged along the profiled track 12. The additional interface 8 of the communication adaptor 1 may receive the PLC data and convert it back into non-PLC data to be sent via the Ethernet. As a result, the PLC communication over the electrical lines 14 of the light trunking system 11 may be used as an intermediate section of a larger communication path between the interface modules 26.1, 26.2, 26.4 and the Ethernet backbone.

One of the communication adaptors 21 may be connected to a computing engine 32 via the additional interface 8. The computing engine 32 may be an edge-based computing engine, for example a LiteCOM® or a similar specialized edge computing hardware server. Further, the computing engine 32 may be connected to a computing machine 31, which may be a cloud computing machine. The computing engine 32 may be an Artificial Intelligence engine, which may connect to multiple edge-based computing engines.

Thus, due to the communication adaptors 1, the light trunking system 11 may offer an enhanced flexibility and speed in the communication operations, while ensuring a relatively low installation effort. The light trunking system 11 may support a fast data communication network in the Gbps range (Gigabits per second).

In particular, the light trunking system 11 makes it possible to reduce the time and cost required to install and integrate, to a local digital telecommunication network or to the cloud, indoor wireless data access solutions, for example WiFi, pLTE, 5G, LiFi, or localization enablement solutions, for example RFID, BLT, UWB.

Further, the light trunking system 11 may comprise an application server 34 for receiving, storing and displaying to an end-user various IP applications related to the application devices 26.1, 26.2, 26.4. The IP applications may include a camera based surveillance, a shop/warehouse management system, a loyalty management system, an indoor navigation system, an enterprise resource planning, and a customer relationship management system.

FIG. 4 illustrates a method 101 for communicating data over the light trunking system 11, when the light trunking system 11 is in service.

Figure 5:
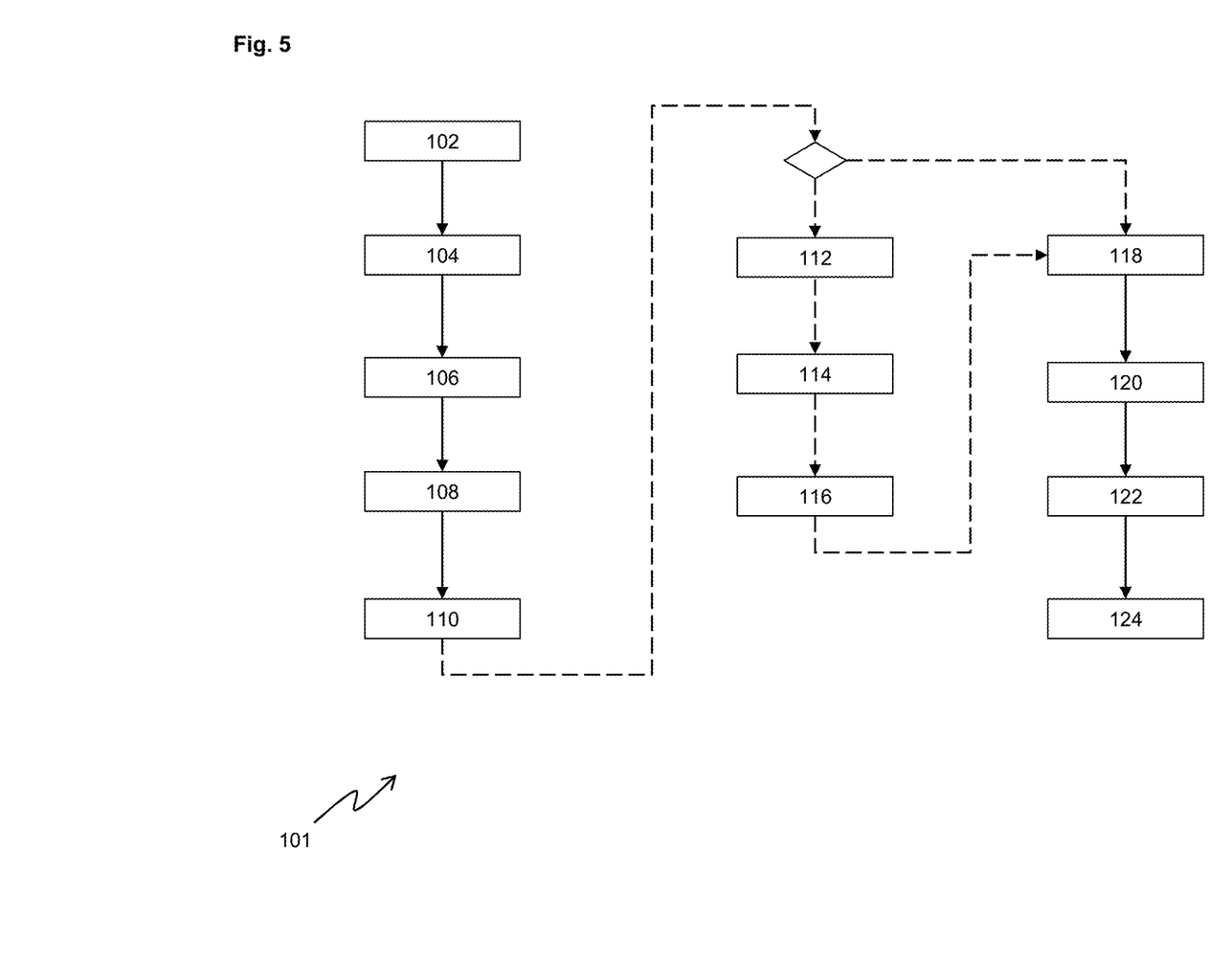
FIG. 5 is a flow chart schematically illustrating a method according to an embodiment and implementing the light trunking system of FIGS. 2 to 4.

The method 101 comprises:
102) implementing the light trunking system 11,
104) measuring instant parameters representative of the communications performed over the electrical lines 14 via the communication adaptors 1,
106) dynamically processing, by the computing engine 32, the measured instant parameters, so as to determine a communication capacity over each electrical line 14 via the communication adaptors 1,
108) selecting an electrical line 14 having a determined communication capacity above a predetermined threshold, and
110) communicating data over the at least one selected electrical line.

Thus, the method 101 makes it possible to obtain a fast data communication by dynamically operating the electrical lines 14 to obtain high communication capacities.

The implementation 102 of the light trunking system may include:
i) inserting the communication adaptors 1 into the profiled track 12 and
ii) connecting the communication adaptors 1 to the different electrical lines 14 arranged in the profiled track 12.

When measuring (104) the instant parameters, the instant parameters may be selected in the group consisting of: the number of electrical lines instantly used, an identification of the electrical lines instantly used, an actual speed of data transmission over each electrical line, a target speed of data transmission over each electrical line, an actual speed of data conversion by each communication adaptor, a target speed of data conversion by each communication adaptor, an actual latency of data conversion by each communication adaptor, a target latency of data conversion by each communication adaptor, an actual latency of data transmission over each electrical line, a target latency of data transmission over each electrical line, a volume of data to be transmitted, a volume of data to be converted, a level of interferences in each electrical line and/or in each communication adaptor, a port status of each additional interface, and a dimming level set for each lighting device.

The selection 108 of the at least one electrical line 14 may be performed by the computing engine 32. The selecting 108 may be performed by the computing engine 32. In order to determine the communication capacity of an electrical line 14, the predetermined threshold may be set as an absolute value that is specific for each measured instant parameter. For example, the predetermined threshold for the actual speed of data transmission over an electrical line 14 may be set to 1 Gbps. Alternatively, the predetermined threshold may be set as a relative value, for example 80%, which is applicable to all the measured instant parameters or which is specific for each measured instant parameter.

Besides, the light trunking system 11 may further comprise mechanical switches 16, which are each arranged to selectively connect a respective communication adaptor 1 to different electrical lines 14. The method 101 may further comprise:
112) controlling the connection, via one of the mechanical switches 16, of a respective communication adaptor 1 to the selected electrical line 14.

In order to enable the computing engine 32 to swiftly select the most appropriate electrical line(s) 14, the method 101 may further comprise:
114) comparing with each other, by the computing engine 31, the communication capacities determined respectively for the electrical lines 14, and, preferably, selecting the electrical line 14 having the highest determined communication capacity.

The method 101 may further comprise:
116) after the measuring of instant parameters, transmitting, by the communication adaptors 1, the measured instant parameters, preferably to the computing engine 31.

The method 101 may further comprise: 118) implementing several light trunking systems 11, for example 10 light trunking systems 11 in a same location or at different, remote locations,
120) regularly collecting, by the computing machine 31, performance data from each one of the light trunking systems 1,
122) dynamically assessing, by the computing machine 31, the collected performance data, preferably by comparing the collected performance data with each other and/or with recorded performance data and/or with a recorded performance model, and 124) as a function of the dynamic assessment, issuing, by the computing machine 31, a message suggesting a change in at least one of the light trunking systems 1 in order to enhance the respective performance data.

The collected performance data may include without being limited to: i) (input) target speed, target latency, measured speed, measured latency, planning data for location, number and type of drivers and luminaires or lighting devices, actual number of LED drivers, actual type and make of luminaire or lighting device, actual dimming level of lighting devices, interference level.

As illustrated by the dashed arrows in FIG. 5, some or all of the optional steps 112 to 124 may be performed in various orders.

The method 101 may further include provisioning a Grade of Service (GoS) and/or a service-level agreement (SLA) with the collected performance data.

Thus, the computing machine 31 may enable increasing the performance of each light trunking system 11, by suggesting apposite changes in the installed configuration, for example in some parameter of the communication adaptor 1 or of interface modules 26.1, 26.2, 26.4 equipping the light trunking system 11.

The present invention has been described in conjunction with various implementations, embodiments and aspects as non-limiting examples. However, other variations can be understood and effected by persons skilled in the art practicing the claimed invention, from the studies of this disclosure, the drawings and the claims. In the claims as well as in the description the word "comprising" or "including" does not exclude other elements or steps, and the indefinite article "a" or "an" does not exclude a plurality. A single element or other unit may fulfill the functions of several entities or items recited in the claims.

The invention claimed is:

1. A light trunking system (11) for supplying power and data to a series of lighting devices (21), wherein the light trunking system (11) comprises:
    a profiled track (12) and electrical lines (14) extending along the profiled track (12) configured to provide AC voltage and arranged on at least one inner side surface of the profiled track;
    at least two communication adaptors, wherein each communication adaptor (1) comprises:
    a housing (2) configured to be inserted in the profiled track (12) of the light trunking system (11), the housing (2) comprising outer walls (1.1),
    electrical contacts (4) arranged to be exposed onto at least one of the outer walls (1.1), the electrical contacts (4) being configured to contact different electrical lines (14) arranged in the profiled track (12) to provide AC voltage,
    a Power Line Communication (PLC) interface (6) configured to receive and transmit narrowband PLC data on the different electrical lines in the profiled track providing AC voltage at different poles in a parallel manner, the narrowband PLC data being conveyed on one or more of the electrical lines (14),
    an additional interface (8) configured to receive and transmit non-PLC, IP protocol data, and
    a data converter (9) that is a PLC modem configured to convert i) narrowband PLC data from the Power Line Communication interface (6) into non-PLC, IP protocol data for the additional interface (8), and ii) non-PLC, IP protocol data from the additional interface (8) into narrowband PLC data for the Power Line Communication interface (6);
    wherein the light trunking system (11) further comprises mechanical switches (16), each mechanical switch (16) being arranged to selectively connect a respective communication adaptor (1) to different electrical lines (14).

2. The light trunking system of claim 1, wherein the additional interface (8) of each communication adapter is an Ethernet interface, the Ethernet interface being a wireless Ethernet interface or a wire-bound Ethernet interface, or a power over Ethernet (POE) Ethernet interface.

3. The light trunking system (11) of claim 1,
    further comprising an interface module selected in the group consisting of: a lighting device (21), a camera (22), a WLAN access point (24), a Private LTE access point, a 5G access point, a LiFi access point, a RTLS module, a RFID module, a wireless communication device, a multi array presence detector, a multi parameters high speed reading sensor for reading parameters like temperature, humidity, carbon dioxide presence or concentration, TVOC, presence, HAL, and accelerometer, and any other device requiring fast data connectivity,
    wherein at least one of the communication adaptors (1) is connected to the interface module via the additional interface (8), and via a cable (26.1, 26.2, 26.4) for non-PLC data.

4. The light trunking system (11) of claim 3 wherein the cable (26.1, 26.2, 26.4) for non-PLC data is an Ethernet patch cable.

5. The light trunking system (11) of claim 1, wherein at least one of the communication adaptors (1) is connected, via the additional interface (8), to a computing machine (31), which is an Artificial Intelligence engine.

6. The light trunking system of claim 1 wherein the additional interface (8) of each communication adapter is configured to receive and/or transmit Ethernet data with Power-over-Ethernet capability.

7. A method (101) for communicating data over a light trunking system (11), the method (101) comprising:
    (102) implementing a light trunking system (11) according to claim 1,
    (104) measuring instant parameters representative of the communications performed over the electrical lines (14) via the communication adaptors (1),
    the instant parameters being selected in the group consisting of: the number of electrical lines (14) instantly used, an identification of the electrical lines (14) instantly used, an actual speed of data transmission over each electrical line (14), a target speed of data transmission over each electrical line (14), an actual speed of data conversion by each communication adaptor (1), a target speed of data conversion by each communication adaptor (1), an actual latency of data conversion by each communication adaptor (1), a target latency of data conversion by each communication adaptor (1), an actual latency of data transmission over each electrical line (14), a target latency of data transmission over each electrical line (14), a volume of data to be transmitted, a volume of data to be converted, a level of interferences in each electrical line (14) and/or in each communication adaptor (1), a port status of each additional interface (8), and a dimming level set for each lighting device (21),
    (106) dynamically processing, by a computing engine (32), the measured instant parameters, so as to determine a communication capacity over each electrical line (14) via the communication adaptors (1), (108) selecting, by the computing engine (32), an electrical line (14) having a determined communication capacity above a predetermined threshold, and (110) communicating narrowband PLC data over the at least one selected electrical line (14).

8. The method (101) of claim 7, wherein the method (101) further comprises: (112) controlling the connection, via one of the mechanical switches (16), of a respective communication adaptor (1) to the selected electrical line (14).

9. The method (101) of claim 7, further comprising: (114) comparing with each other, by the computing engine (32), the communication capacities determined respectively for the electrical lines (14), and selecting the electrical line (14) having the highest determined communication capacity.

10. The method (101) of claim 7, further comprising: after the measuring of instant parameters, (116) transmitting, by the communication adaptors (1), the measured instant parameters.

11. The method (101) of claim 7, further comprising:

(118) implementing several light trunking systems (11), (120) regularly collecting, by a computing machine (31), performance data from each one of the light trunking systems (11), (122) dynamically assessing, by the computing machine (31), the collected performance data, by comparing the collected performance data with each other and/or with recorded performance data and/or with a recorded performance model, and (124) as a function of the dynamic assessment, issuing, by the computing machine (31), a message suggesting a change in at least one of the light trunking systems (11) in order to enhance the respective performance data.

12. The method (101) of claim 7, wherein the computing engine (32) is an Artificial Intelligence engine.

* * * * *